(12) United States Patent
Yamamoto et al.

(10) Patent No.: US 8,299,654 B2
(45) Date of Patent: Oct. 30, 2012

(54) HIGH FREQUENCY ELECTRIC WIRE

(75) Inventors: Kitao Yamamoto, Akishima (JP);
Takeshi Sato, Akishima (JP); Keisuke Abe, Akishima (JP); Masashi Mochizuki, Akishima (JP); Yasuyuki Okiyoneda, Akishima (JP)

(73) Assignee: Showa Aircraft Industry Co., Ltd., Tokyo (JP)

( * ) Notice: Subject to any disclaimer, the term of this patent is extended or adjusted under 35 U.S.C. 154(b) by 336 days.

(21) Appl. No.: 12/792,323

(22) Filed: Jun. 2, 2010

(65) Prior Publication Data

US 2011/0140539 A1 Jun. 16, 2011

(30) Foreign Application Priority Data

Dec. 11, 2009 (JP) .................. 2009-281587

(51) Int. Cl.
*H01B 7/30* (2006.01)
(52) U.S. Cl. ....................................... 307/147
(58) Field of Classification Search ............ 307/147
See application file for complete search history.

(56) References Cited

FOREIGN PATENT DOCUMENTS

| JP | 5-263377 | 10/1993 |
|---|---|---|
| JP | 2008-087733 | 4/2008 |

*Primary Examiner* — Robert L. Deberadinis
(74) *Attorney, Agent, or Firm* — Jordan and Hamburg LLP

(57) ABSTRACT

A high frequency electric wire is provided in such a manner that a large number of wires are bundled, twisted and insulated with an outer sheath S. Each wire has an extra-fine hollow pipe structure of a capillary shape. The wire is provided to make its hollow section with the extra-fine hollow pipe structure an air cavity or to cause its hollow section to house an insulating material. In the latter case, the wire is provided by causing a metal conductor to adhere to the outer periphery of an extra-fine insulating yarn, which serves as the insulating material, by plating or vapor-deposition. The electric wire is used as a circuit cable or a coil in a non-contact power feeding device which supplies power based on a mutual induction action of the electromagnetic induction. In this manner, the electric wire fulfills its function to suppress and reduce an increase of the alternating current resistance due to a high frequency alternating current.

8 Claims, 6 Drawing Sheets

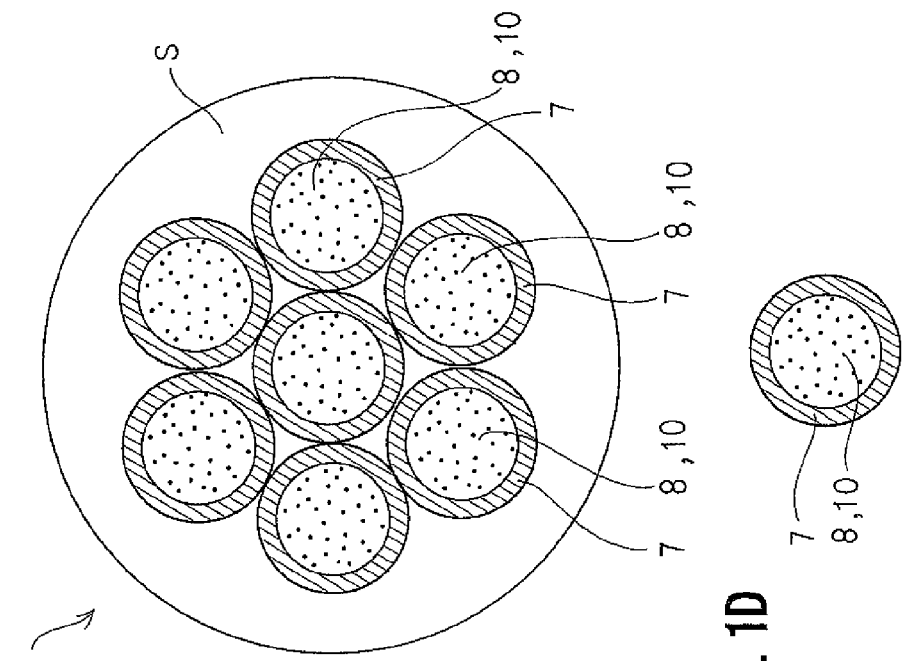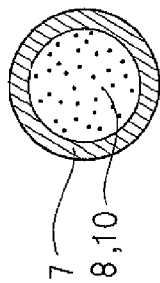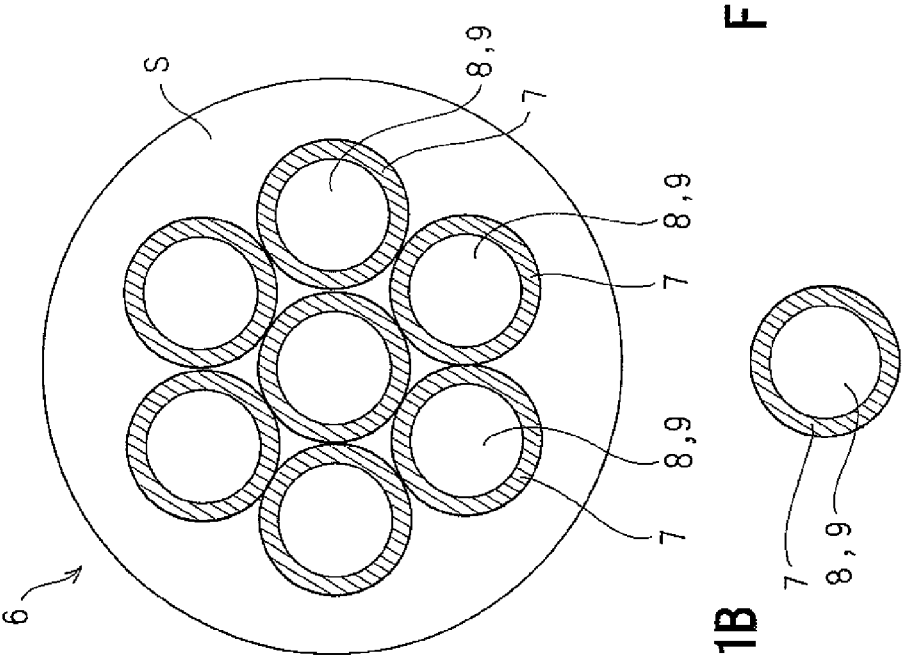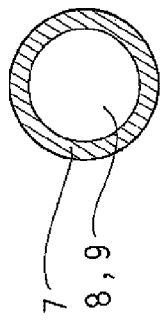

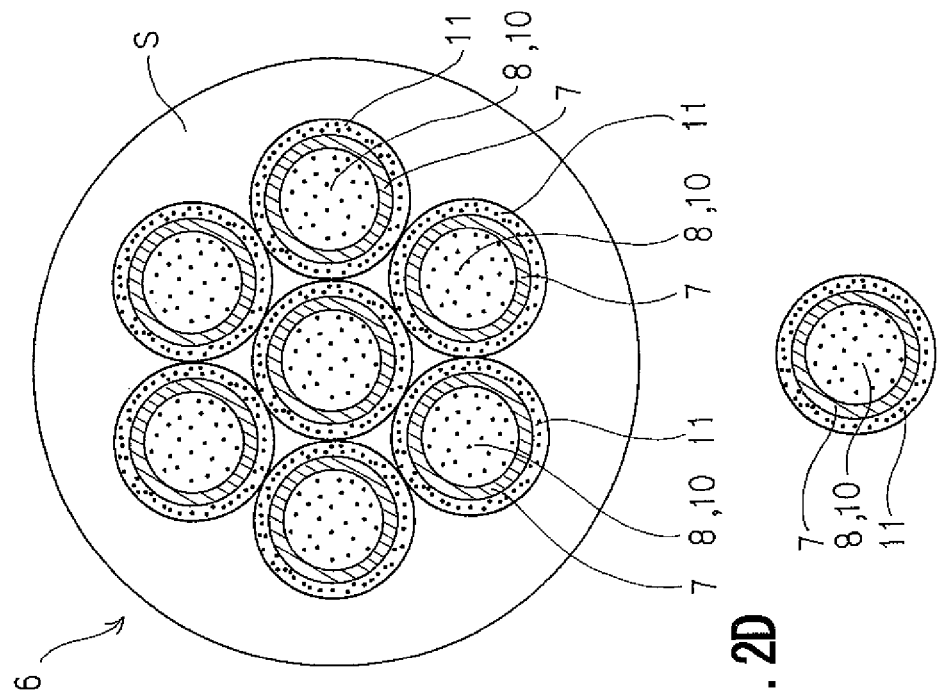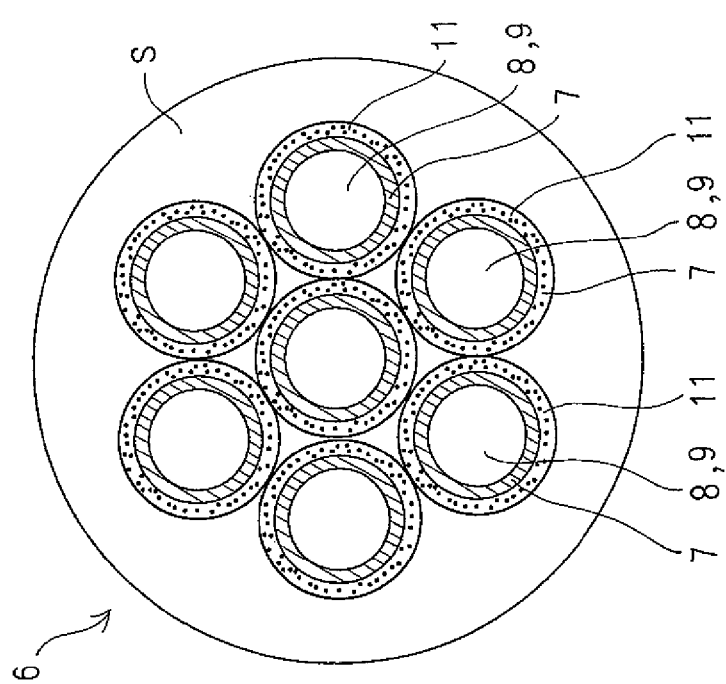

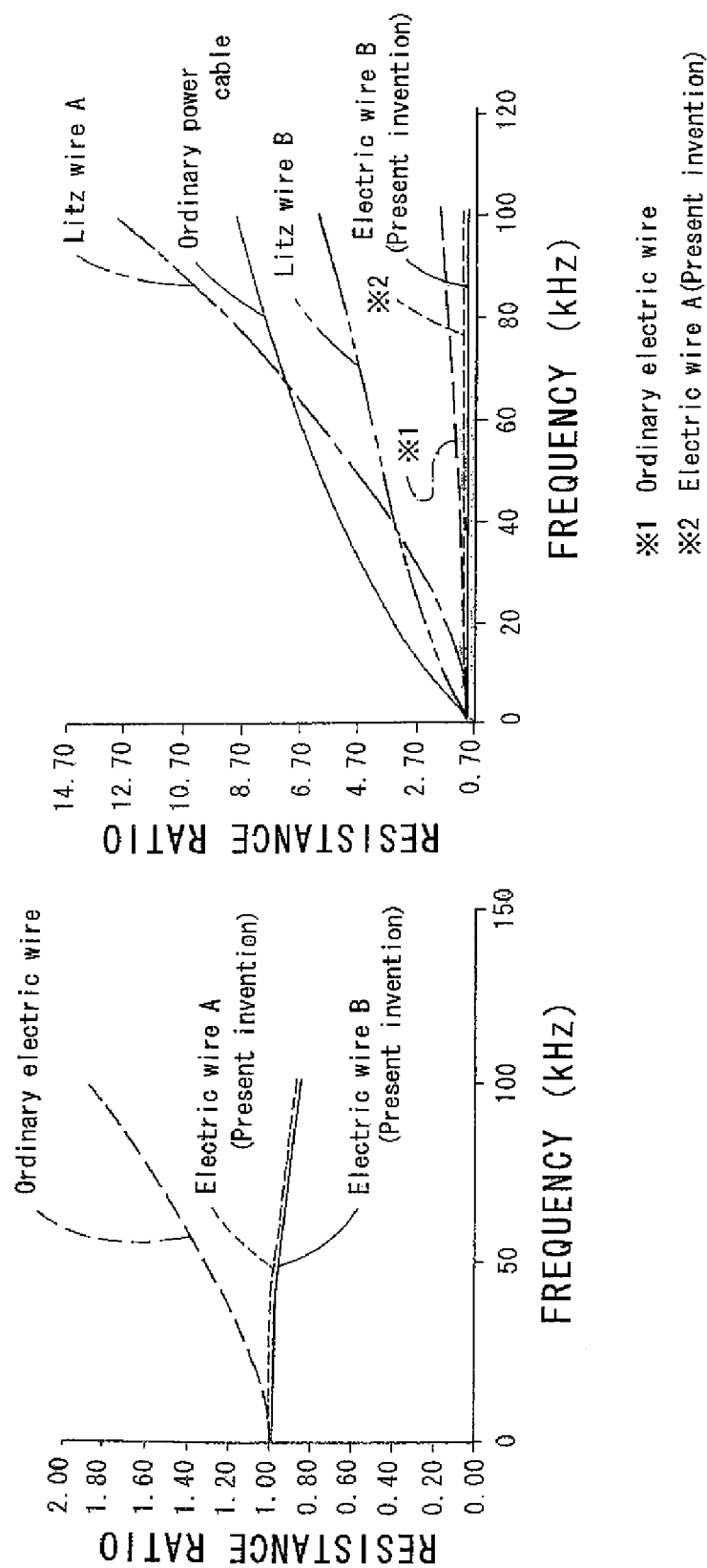

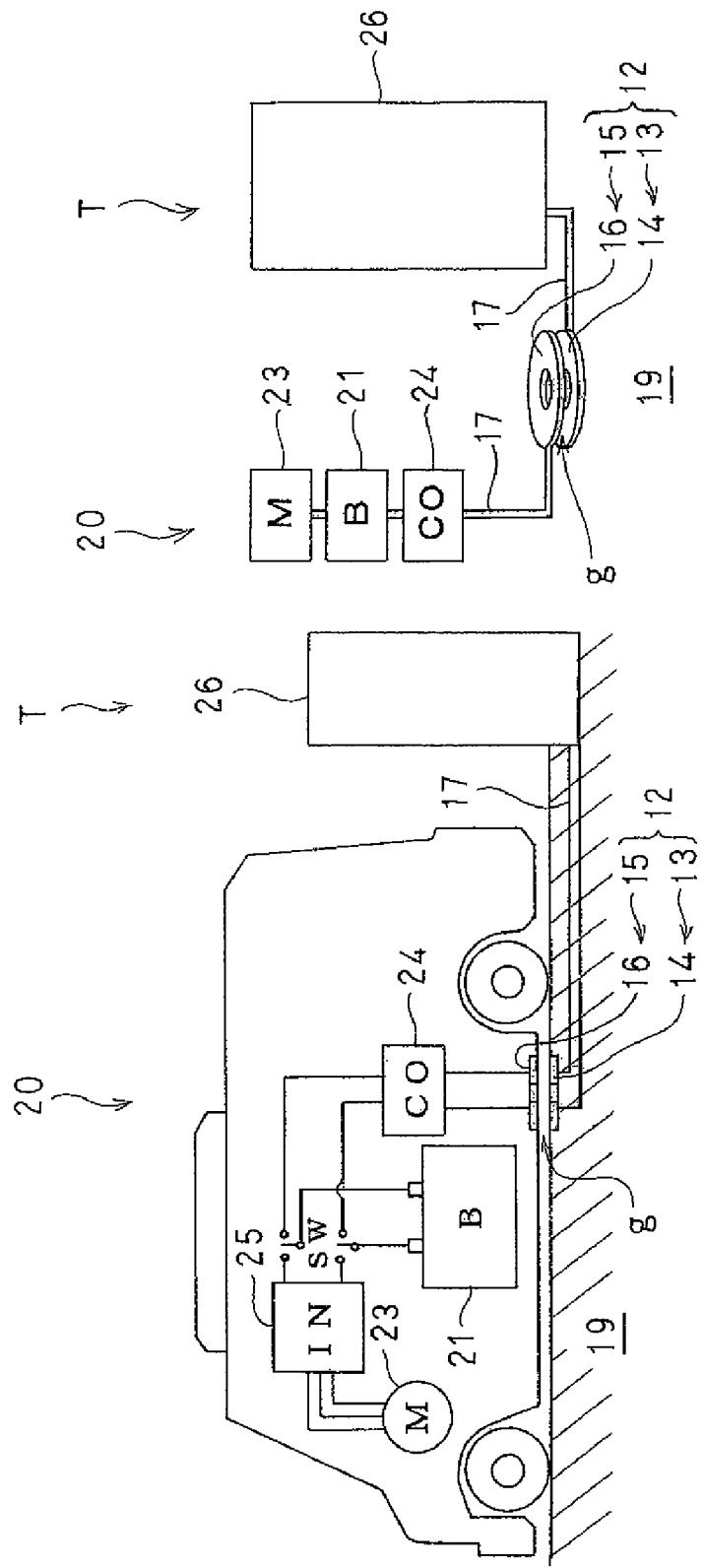

HIGH FREQUENCY ELECTRIC WIRE

BACKGROUND OF THE INVENTION

1. Field of the Invention

The present invention relates to a high frequency electric wire, and more particularly to an electric wire which can be used as a wiring material, a winding material or the like for high frequency.

2. Description of the Prior Art (Technological Background)

For example, a high frequency alternating current method is adopted in a non-contact power feeding device, but the increase in frequency is remarkable in the frequencies used.

In other words, in the non-contact power feeding device which supplies power through an air gap to a power receiving side coil mounted on an electric vehicle and the like from a fixed power feeding side coil based on the mutual induction action of the electromagnetic induction, the high frequency alternating current method is adopted from the viewpoint of the needs such as improvement of battery charging efficiency, a larger gap size, and a light and small coil. In view of these needs, the high frequency of about 20 kHz is now used, but it is projected to use a high frequency between 50 kHz and 100 kHz or above 100 kHz in the future.

For example, even in audio equipment, game equipment, personal computers and various types of other electrical appliances other than the non-contact power feeding device, the needs for adoption of the high frequency alternating current method and the increase in useful frequency are remarkable.

(Description of the Prior Art)

In such a non-contact power feeding device and other equipment, an electric wire 1 or 2 as shown in FIG. 4 has been typically used as a wiring material, a winding material or the like, for example, as a circuit cable or a coil.

The electric wire 1 as shown in FIG. 4A is an ordinary electric wire of this kind. The electric wire 1 is made by bundling and twisting a large number of wires 3 made of a solid wire, and insulating the entire outside surface by an outer sheath S. The electric wire 2 as shown in FIG. 4C is referred to as a litz wire. The electric wire 2 is made, as shown in FIG. 4D, by bundling and twisting a large number of wires 5 of which the outer periphery is coated with an insulating film 4 such as enamel, and then insulating the entire outside surface by an outer sheath S. The individual wire 5 is made of fine wire of which the diameter is 200μ or less.

FIGS. 4A and 4C are schematic views, wherein one electric wire 1 or 2 consists of seven wires 3 or 5. It is however to be noted that, for practical purposes, one electric wire 1 or 2 consists of several tens of wires to several tens of thousands of wires 3 or 5.

(Conventional Technical Literature Information)

(Patent Document)

Such a non-contact power feeding device is disclosed in patent document 1. The electric wire 2, that is, the litz wire is disclosed, for example, in patent document 2.

Patent Document 1: Japanese Unexamined Patent Publication No. 2008-087733

Patent Document 2: Japanese Unexamined Patent Publication No. Hei 5-263377

3. Problems to be Solved by the Invention (Problems)

It has been pointed out that the conventional technology has the following problems.

(First Problem)

In the case where the electric wire 1 (ordinary electric wire) as shown in FIG. 4A is used as a circuit cable for a high frequency alternating current or for the high frequency power transmission, there are problems in high frequency alternating current resistance due to a skin effect, Joule heat loss, and power loss.

In other words, when the electric wire 1 (ordinary wire) is used, the higher the frequency, the higher the influence of the skin effect and as a result, the frequency characteristics deteriorate, the high frequency alternating current resistance increases, the square of the Joule heat loss increases and as a result, the power loss becomes obvious.

The skin effect will now be described. As is well known, the higher the frequency, the easier the alternating current flows on a surface side of the electric wire 1 by a mutual action between a generating alternating magnetic flux and an electric current and the electric current density is concentrated on the surface side. As a result, the high frequency alternating current flows intensively on part of the total cross-sectional area of the electric wire 1, that is, on an extremely-thin section of the surface side and the alternating current resistance value increases due to reduction of the current-carrying area.

(Second Problem)

As is well known, the electric wire 2 (litz wire) as shown in FIG. 4C has been developed for high frequency to solve the problems of the electric wire 1 (ordinary electric wire) described above.

Namely, the electric wire 2 is made by bundling, for example, thousands of extra-fine wires 5, of which the diameter is 200μ or less, coated with an insulating film 4. With this structure, the electric wire 2 is provided in such a manner that a surface area of each wire 5, that is, a surface area of its outer peripheral surface, can be increased in total. In other words, the electric wire 2 is provided to disperse, split and reduce the concentration of the electric current density due to the skin effect by increasing the number of the surfaces, that is, the outer peripheral surfaces of the individual wire 5 as compared to the electric wire 1 described above, thereby increasing the surface area accordingly.

However, even in the electric wire 2, it has been further required to suppress and decrease the high frequency alternating current resistance, to lower the Joule heat loss, and to reduce the power loss in accordance with a higher level of the useful frequency. In this manner, it has been desired to improve the frequency characteristics of the electric wire 2.

It has also been pointed out that the electric wire 2 has a problem from a cost viewpoint. First, the high frequency alternating current flows only on the surface of each wire 5 based on the skin effect and it does not flow in the center thereof. In this manner, it has been pointed out that the central side of the total cross-sectional area of each wire 5 except for the extremely-thin surface side is a non-use area, that is, a wasteful area on which the electric current does not flow and exhibits greater loss capability in material costs (as in the electric wire 1 described above). It has also been pointed out that the production costs become higher because the outer periphery of each wire 5 must be coated with an insulating film 4.

SUMMARY OF THE INVENTION

1. Present Invention

In view of these circumstances, a high frequency electric wire of the present invention was developed to solve the problems of the conventional technology of this kind.

It is therefore an object of the present invention to provide a high frequency electric wire in which, first, the high frequency alternating current resistance can be reduced to decrease a Joule heat loss, thereby improving the frequency characteristics, and, second, the first point can be excellently realized in terms of cost performance.

2. Means for Solving the Problems

A technical means of the present invention for solving these problems is as follows as stated in the claims of patent.

(Aspect 1)

A high frequency electric wire according to the present invention is provided in such a manner that a large number of wires are bundled, twisted and insulated by an outer sheath. The individual wire has an extra-fine hollow pipe structure of a capillary shape.

Further, as described in the following aspects 2 through 6, the high frequency electric wire according to the present invention can be modified by adding technically limited elements.

(Aspect 2)

In the high frequency electric wire according to aspect 1, the individual wire is provided with a hollow section with an extra-fine hollow pipe structure providing an air cavity.

(Aspect 3)

In the high frequency electric wire according aspect 2, the outer periphery of the individual wire is coated with an insulating film.

(Aspect 4)

In the high frequency electric wire according to aspect 2, the electric wire is used in a non-contact power feeding device. The non-contact power feeding device supplies electric power to a secondary coil of a load side circuit from a primary coil of a power source side circuit, with no contact, based on a mutual induction action of the electromagnetic induction. The electric wire is used as a circuit cable or a coil of the non-contact power feeding device to fulfill its function for suppressing or reducing the increase of an alternating current resistance due to a high frequency alternating current, thereby reducing the Joule heat loss.

(Aspect 5)

In the high frequency electric wire according to aspect 1, the individual wire has a hollow section with an extra-fine pipe structure adapted to house an insulating material therein.

(Aspect 6)

In the high frequency electric wire according to aspect 5, the individual wire is provided to cause a metal conductor to adhere to the outer periphery of an extra-fine insulating yarn serving as the insulating material by plating or vapor deposition.

(Aspect 7)

In the high frequency electric wire according to aspect 5, the outer periphery of the individual wire is coated with an insulating film.

(Aspect 8)

In the high frequency electric wire according to aspect 5, the electric wire is used in a non-contact power feeding device, the non-contact power feeding device is provided to supply electric power to a secondary coil of a load side circuit from a primary coil of a power source side circuit based on a mutual induction action of the electromagnetic induction, and the electric wire is used as a circuit cable or a coil of the non-contact power feeding device to suppress or reduce the increase of the alternating current resistance due to a high frequency alternating current, thereby reducing the Joule heat loss.

3. Operation

Operation of the present invention will now be described hereunder.

(1) A high frequency electric wire according to the present invention is made by bundling and twisting a large number of wires, each having an extra-fine hollow pipe structure.

(2) The electric wire according to the present invention is used as a wiring material or a winding material.

(3) A large number of wires, each having a hollow pipe structure, have an inner periphery, respectively. In other words, the electric wire has a large surface area in total per unit length including the outer peripheral surface and as a result, the concentration of electric current density due to the skin effect can be dispersed, mitigated and decreased.

(4) Since the electric wire is provided to spread the current-carrying surface of the high frequency alternating current, the alternating current resistance and the Joule heat loss can be decreased. Thus, the electric wire provides superb frequency characteristics because it is possible to reduce the influence of the skin effect which increases as the frequency becomes higher.

(5) The points described under items 3 and 4 were backed up by the results of the experiments.

(6) There is no nonuse and wasteful conductor section in the electric wire because the high frequency alternating current flows through substantially all of the cross-sectional area of a wire conductor section with a hollow pipe structure. Thus, there is no wasteful section in the conductor material of the individual wire and as a result, both the conductor cost and weight can be drastically decreased.

(7) Further, the individual wire can be readily made by following a process conforming to a process for making an ordinary metal pipe or a process for causing a metal conductor to adhere to an extra-fine insulating yarn by a metal plating method or a metal vapor-deposition method.

(8) Still further, the electric wire according to one embodiment of the present invention in which a hollow section of the individual wire is an air cavity is especially excellent in decrease in weight. In addition, the electric wire according to another embodiment of the present invention in which the hollow section of the individual wire houses an insulating material therein is excellent in strength, elasticity, flexibility and the like.

(9) In the electric wire according to a still further embodiment of the present invention in which the individual wire is coated with an insulating film, the outer peripheral surface of the individual wire which was lost by the contact of each wire without the insulating film as well as the surface area of item (3) becomes a current-carrying surface. As a result, dispersion, mitigation and decrease of the concentration of the electric current density due to the skin effect can be accelerated to provide superb frequency characteristics.

(10) The high frequency electric wire of the present invention produces the following effects.

4. Effects of the Invention (First Effect)

The electric wire of the present invention is excellent in frequency characteristics. In other words, the high frequency alternating current resistance can be decreased to reduce the Joule heat loss.

The high frequency electric wire of the present invention adopts a large number of wires with an extra-fine hollow pipe structure of a capillary shape. The concentration of the electric current density due to the skin effect can be dispersed, mitigated and reduced by bundling and twisting the individual wires.

In this manner, in the electric wire of the present invention, the high frequency alternating current resistance can be further suppressed and decreased to improve the frequency characteristics as compared to the ordinary electric wire and the litz wire of the conventional technology of this kind. As a result, the Joule heat loss can be reduced to dramatically cut the power loss. For example, these effects can be achieved even in the case where the electric wire is used in a circuit cable or a coil of the non-contact power feeding device.

(Second Effect)

The first effect can be significantly realized in terms of various costs. Namely, the high frequency electric wire of the present invention adopts a large number of wires with a hollow pipe structure of a capillary shape into which the electric current flows.

The ordinary electric wire and the litz wire of the conventional technology of this kind described above are provided on the central side of each wire with a nonuse section, that is, a wasteful section into which the electric current does not flow due to the skin effect. Since the electric wire of the present invention is not provided with such a nonuse section, the loss can be eliminated. In the case of the electric wire of the present invention, the material cost of the individual wire corresponding to its central portion which is a hollow section can be decreased. Further, the hollow section of the electric wire of the present invention contributes to the decrease in weight to attain weight saving.

Since the individual wire of the electric wire of the present invention is made following a process conforming to a process for making an ordinary metal pipe or a process of a metal plating method or a metal vapor-deposition method, the electric wire can be readily made as in the ordinary electric wire of the conventional technology of this kind. The production cost of the electric wire of the present invention can be reduced as compared to the conventional technology (litz wire) in which an insulating film must be formed for each wire.

As described above, the present invention has a great effect in that all the problems of the conventional technology of this kind can be solved by the first and second effects described above.

BRIEF DESCRIPTION OF THE DRAWINGS

The above and other objects, features and advantages of the present invention will become more apparent from the following description when taken in conjunction with the accompanying drawings.

FIG. 1 is provided to describe a preferred embodiment for carrying out the present invention regarding a high frequency electric wire, wherein FIG. 1A is a schematic cross-sectional view of a first embodiment, FIG. 1B is a cross-sectional view of the individual wire used therein, FIG. 1C is a schematic cross-sectional view of a second embodiment, and FIG. 1D is a cross-sectional view of the individual wire used therein;

FIG. 2 is provided to describe a preferred embodiment for carrying out the present invention, wherein FIG. 2A is a schematic cross-sectional view of a third embodiment, FIG. 2B is a cross-sectional view of the individual wire used therein, FIG. 2C is a schematic cross-sectional view of a fourth embodiment, and FIG. 2D is a cross-sectional view of the individual wire used therein;

FIG. 3 provides graphs comparing the test results of the frequency characteristics of the embodiments of the present invention to those of the frequency characteristics of a conventional technology of this kind, wherein FIG. 3A shows one example and FIG. 3B shows another example;

FIG. 4 is provided to describe a conventional technology of this kind, wherein

FIG. 5 is provided to describe a non-contact power feeding device, wherein FIG. 5A is the explanatory side view and FIG. 5B is a block diagram.

DETAILED DESCRIPTION OF THE PREFERRED EMBODIMENTS

Figure 4A:
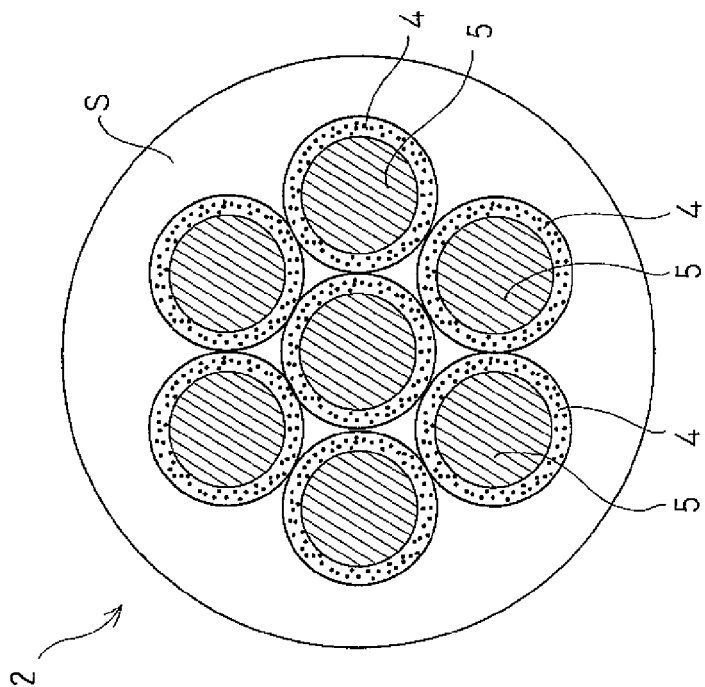
FIG. 4A is a schematic cross-sectional view of an ordinary electric wire.
Figure 4B:
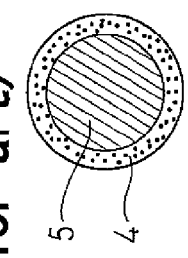
FIG. 4B is a cross-sectional view of the individual wire used therein.

A preferred embodiment of the present invention will now be described in detail.

Outline of the Present Invention

An outline of the present invention will be described with reference to FIGS. 1 and 2.

A high frequency electric wire 6 of the present invention is provided in such a manner that a large number of wires 7 are bundled, twisted and insulated by an outer sheath S. The individual wire 7 has an extra-fine hollow pipe structure of a capillary shape.

As a typical example, the individual wire 7 has a hollow section 8 with an extra-fine hollow pipe structure which is an air cavity 9 as shown in FIGS. 1A and 1B, or the hollow section 8 of the individual wire 7 houses an insulating material 10 therein as shown in FIGS. 1C and 1D. In the latter example, the individual wire 7 is provided to cause a metal conductor to adhere to the outer periphery of an extra-fine insulating yarn serving as the insulating material 10 by plating or vapor-deposition.

As shown in FIG. 2, it can also be considered that the outer periphery of the individual wire 7 is coated with an insulating film 11 in both examples described above.

The present invention is as outlined above.

DETAILED DESCRIPTION OF THE PRESENT INVENTION

The present invention will now be described in detail.

First, the individual wire 7 of the electric wire 6 is described with reference to FIG. 1. The wire 7 is made of a metal conductor such as pure copper, copper alloy, aluminum or gold. The typical diameter of the wire 7 is between several tens of microns and several hundreds of microns, but it is also possible for the wire 7 to have a diameter of several microns to several thousands of microns.

The wire 7 is formed in an extra-fine linear shape and has a hollow pipe structure. In other words, the wire 7 is formed in a capillary tube shape of a micro unit of which the axial center section is a hollow section 8. To take an example, the diameter of the hollow section 8 is 10μ and its peripheral thickness is 1.5μ.

The wire 7 as shown in FIGS. 1A and 1B is made according to a process for making an ordinary metal pipe. In addition, the wire 7 as shown in FIGS. 1C and 1D is made by a metal plating method or a metal vapor-deposition method.

In the metal plating method or the metal vapor-deposition method, a metal conductor is caused to adhere to an outer periphery of an extra-fine insulating yarn which has high insulating resistance and becomes an insulating material 10. For example, the extra-fine insulating yarn with the line diameter of 10μ is coated with a metal conductor with the thickness of 1.5μ. For example, resin, glass, ceramics, rubber or other nonconductor is available for a material of the insulating yarn serving as the core material. In the case where high tensile force is required, as an example, polyphenyleneether PPE (modified PPO) (Trademark "Zylon" by General Electric Co., Ltd., USA) can be used. Such an insulating yarn can be made by a single fiber or plurality of twisted fibers.

The electric wire 6 is made by bundling and twisting a large number of wires 7 with an extra-fine hollow pipe structure of a capillary shape and then winding and insulating the wires 7 by an outer sheath S.

First, several tens of wires 7 to several tens of thousands of wires 7 are bundled to provide one electric wire 6. For example, 2,000 to 8,000 wires 7 are used to provide an electric wire 6 of which the conductor's cross-sectional area is 1.25 sq·mm. About 50,000 wires 7 are used to provide an electric wire 6 of which the conductor's cross-sectional area is 11 sq·mm.

The electric wire 6 is thus made by bundling and twisting a large number of wires 7 in accordance with the production of an ordinary electric wire. Namely, the wires 7 bundled in such a manner are twisted at predetermined pitch intervals and then, the entire periphery is insulated by an insulating film layer, that is, the outer sheath S to provide the electric wire 6.

Usually, the wires 7 are individually bundled and twisted together to provide one electric wire 6. However, a large number of wires 7 can be bundled and twisted first to provide a child bundle and then, a plurality of child bundles can be bundles and twisted to provide one electric wire 6. Further, a plurality of child bundles can be bundled and twisted to provide one parent bundle and then, a plurality of parent bundles can be bundled and twisted to provide one electric wire 6. Still further, an assembly of the parent bundles can be bundled and twisted to provide one electric wire 6.

In the electric wire 6 of an example as shown in FIGS. 1A and 1B, the hollow section 8 of the individual wire 7 is an air cavity 9 in which air exists. Also, in the electric wire 6 of an example as shown in FIGS. 1C and 1D, the hollow section 8 of the wire 7 houses an insulating material 10 with high insulating resistance.

Further, in the electric wire 6 of an example as shown in FIGS. 2A and 2B, the outer periphery of each wire 7 is coated with an insulating film 11. Another structure of the electric wire 6 of this example conforms to the electric wire 6 and the individual wire 7 of an example shown in FIGS. 1A and 1B. Referring to the electric wire 6 of an example as shown in FIGS. 2C and 2D, the outer periphery of each wire 7 is coated with an insulating film 11 and a hollow section 8 of each wire 7 houses an insulating material 10 with high insulating resistance. Another structure of the electric wire 6 of this example conforms to the electric wire 6 and the individual wire 7 of the example as shown in FIGS. 1C and 1D.

In two examples as shown in FIG. 2, the insulating film 11 adapted to coat the outer periphery of the wire 7 conforms to the insulating film 4 of the electric wire 2 (litz wire) described above (refer to FIGS. 4C and 4D) and an enamel film is typically used, but it will be obvious that an insulating resin or other nonconductors can also be used.

Although not shown in the figures, the electric wire 6 can be modified as follows. For example, in the examples as shown in FIGS. 2A and 2B and in the examples as shown in FIGS. 2C and 2D, it can also be considered that an outer periphery of the insulating film 11 is coated with a metal conductor with a structure conforming to the wire 7. Further, the metal conductor can also be coated with a film with a structure conforming to the insulating film 11.

FIGS. 1A and 1C and FIGS. 2A and 2C are schematic views, wherein 7 wires 7 are shown to provide one electric wire 6, but, for practical purposes, more than several tens of wires 7 to several tens of thousands of wires 7 are used to provide one electric wire 6.

Details of the present invention are as described above.

(Non-Contact Power Feeding Device 12)

Figure 6:
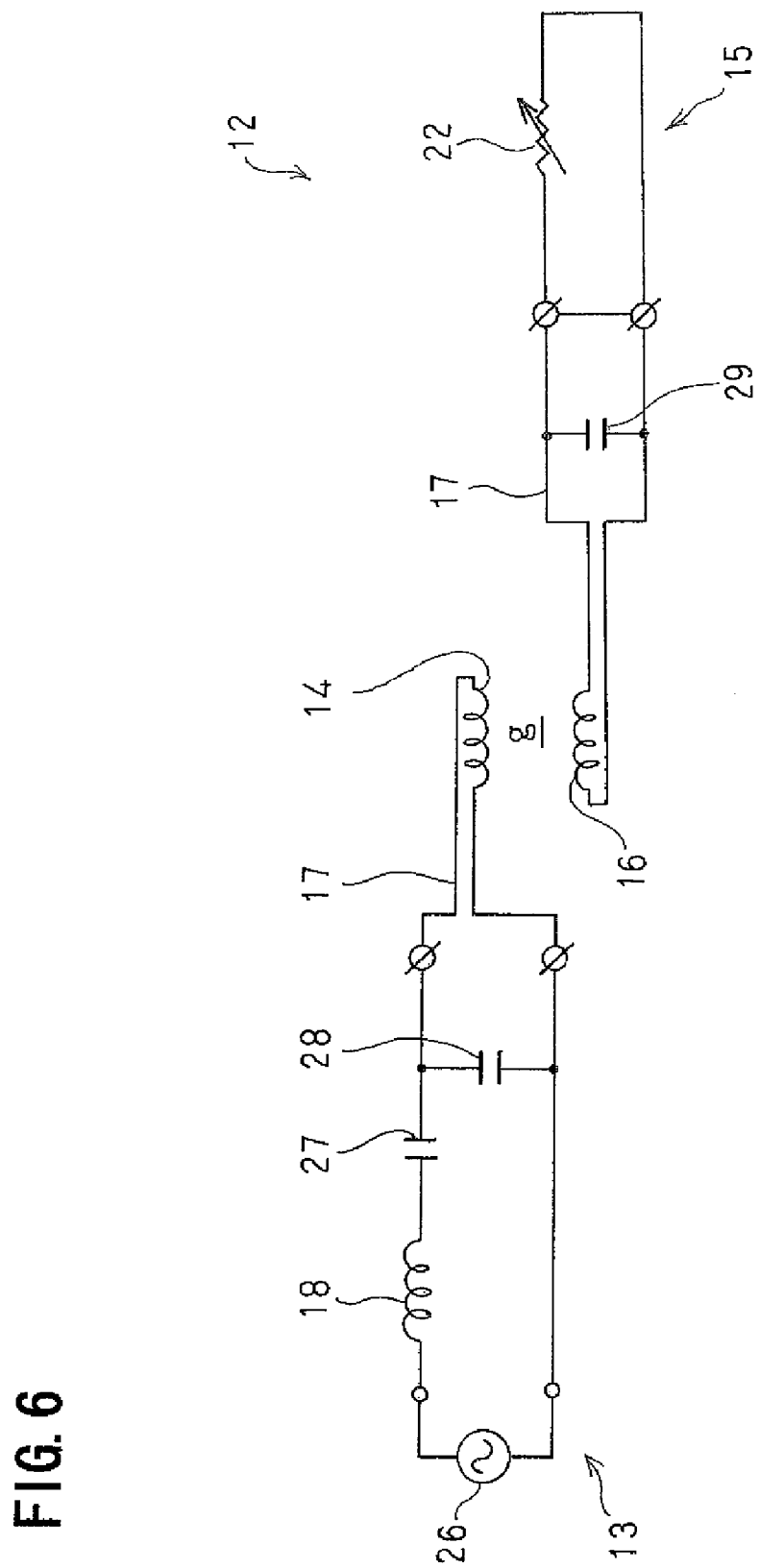
FIG. 6 is a circuit diagram to describe the non-contact power feeding device.

A non-contact power feeding device 12 will be described hereunder with reference to FIGS. 5 and 6.

A high frequency electric wire 6 according to the present invention is, for example, used in a non-contact power feeding device 12. The non-contact power feeding device 12 supplies power, with no contact, to a secondary coil 16 of a load side circuit 15 from a primary coil 14 of a power source side circuit 13 based on a mutual induction action of the electromagnetic induction.

The electric wire 6 is used as a circuit cable 17 or coils 14, 16 and 18 in the power source side circuit 13 and the load side circuit 15 of the non-contact power feeding device 12 to fulfill its function for suppressing and reducing the increase in the alternating current resistance due to a high frequency alternating current, thereby reducing the Joule heat loss.

Such a non-contact power feeding device 12 (IPS) will now be described in detail. As shown in FIG. 5, the power source side circuit 13 on the power feeding side is fixedly secured to a ground side 19 in a power feeding area of a power feeding stand T and the like.

On the contrary, the load side circuit 15 on the power receiving side is mounted on vehicles 20 such as an electric car or other movable bodies. The load side circuit 15 is typically connected to an in-vehicle battery 21, but there are some cases where it can be connected direct to various types of a load 22. The primary coil 14 of the power source side circuit 13 and the secondary side coil 16 of the load side circuit 15 are positioned to face each other with no contact through an air gap g in the case of power feeding.

The secondary coil 16 is connected to the in-vehicle battery 21 in an example of FIG. 5 and a running motor 23 is driven by the battery 21. Reference numeral 24 in FIG. 5 is a converter for converting an alternating current to a direct current and reference numeral 25 is an inverter for converting the direct current to the alternating current.

In the case of power feeding, when a high frequency alternating current of, for example, about 100 kHz from a high frequency power source 26 is supplied to the primary coil 14 of the power source side circuit 13 as an exciting current, a magnetic field is generated to form a magnetic flux, wherein a magnetic path of the magnetic flux is formed between the primary coil 14 and the secondary coil 16. In this manner, the primary coil 14 is electromagnetically coupled to the secondary coil 16. The magnetic flux passes through the secondary coil 16 for linkage to generate an induced electromotive force on the secondary coil 16.

In the non-contact power feeding device 12, power is supplied to the load side circuit 15 from the power source side circuit 13 by the mutual induction action of the electromagnetic induction. Reference numerals 27, 28, 29 in FIG. 6 are capacitors which are used for resonance with the coils 14, 16 and 18.

The non-contact power feeding device 12 is as described above.

(Operation)

The high frequency electric wire 6 according to the present invention is constructed as described above. The operations of the present invention will now be described.

(1) The high frequency electric wire 6 of the present invention is made by bundling and twisting a large number of wires 7 with an extra-fine hollow pipe structure of a capillary tube shape (refer to FIGS. 1 and 2).

(2) The electric wire 6 is used as a high frequency wiring or winding material. The electric wire 6 is used, for example, as a circuit cable or coils 14, 16 and 18 (refer to the non-contact power feeding device 12 of FIG. 6). Further, the electric wire 6 is used for wiring of audio equipment, game equipment, personal computers and various types of other electric appliances, for example, for wiring for feeding acoustic frequency power to a speaker or an earphone.

(3) When the alternating current is sent to the electric wire 6, the concentration of the electric current density by the skin effect can be dispersed, mitigated and decreased.

Namely, the electric wire 6 is made by bundling and twisting a large number of wires 7 (e.g., several tens of wires to several tens of thousands of wires) with a hollow pipe structure. Each wire 7 subdivided in this way has many inner peripheral surfaces corresponding to the number of wires 7. As a result, the electric wire 6 has also a larger surface area in total per unit length including its outer peripheral surface in proportion to the number of wires 7 (refer to FIGS. 1 and 2).

In the electric wire 6, the electric current density of each wire 7 can be lowered in response to such a larger surface area. Accordingly, the influence of the skin effect which increases as the frequency becomes high is dispersed, mitigated and decreased. In other words, the concentration of electric current density due to the skin effect is dispersed, mitigated and decreased as compared to the electric wire of which the outer diameter of the conductor and the number of wires are the same.

In the example of FIG. 2, the outer peripheral surface of each wire 7 is insulated and a disadvantage of the outer peripheral surface is eliminated, but the cost of the insulating film 11 is increased.

(4) In this manner, in the electric wire 6, the high frequency current also flows to a newly formed large inner peripheral surface and the concentration of the electric current density of the high frequency alternating current can be dispersed, mitigated and decreased. Simply, since the resistance is substantially in inverse proportion to the current-carrying area, the high frequency alternating current resistance is suppressed and decreased to reduce the Joule heat loss.

In this manner, the electric wire 6 can reduce the influence of the skin effect which increases as the frequency become high, thereby providing excellent frequency characteristic.

(5) The operation of the present invention of item (4) described above has been backed up by the test results. In other words, an experiment has shown that the electric wire 6 according to the present invention is excellent in frequency characteristics. The results of the experiment are shown in the graph of FIG. 3.

In this experiment, the alternating current resistance value of the electric wire 6 of the embodiments of the present invention and that of the conventional technology of this kind in 1 kHz of frequency are regarded as 1 and the ratio of the alternating current resistance value for each frequency was actually measured.

Referring to the electric wire 6 of the present invention used in the experiment, the number of the individual wires 7 used in a bundle for an electric wire B (the conductor cross-sectional area: 1.25 sq·mm) is 4 times the number of wires 7 for an electric wire A (the conductor cross-sectional area: 1.25/4 sq·mm) (the number of electric wires A: 2,000; the number of the electric wires B; 8,000). The electric wire 6 of the example shown in FIG. 1A was used for the electric wires A and B.

Figure 4C:
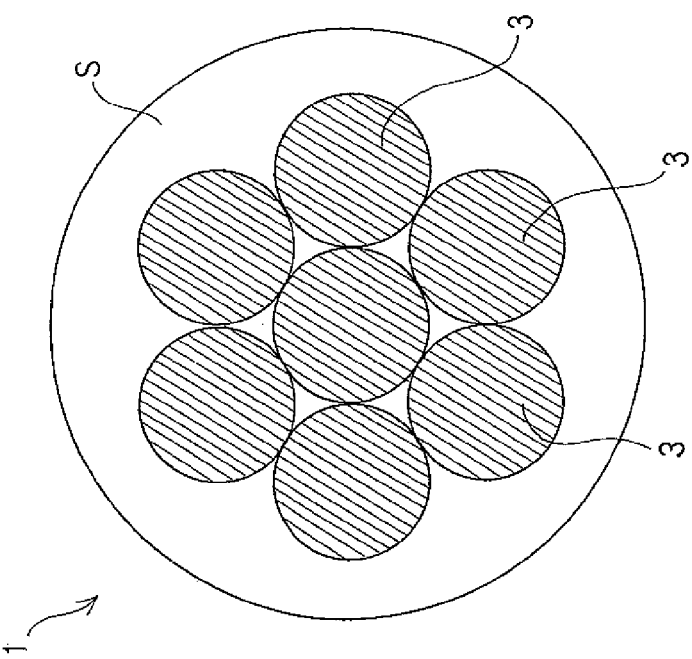
FIG. 4C is a schematic cross-sectional view of a litz wire.
Figure 4D:
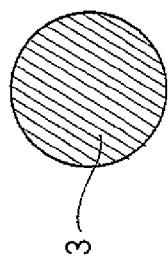
FIG. 4D is a cross-sectional view of the individual wire used therein.

A commercially available twisted wire (the conductor cross-sectional area: 1.25 sq·mm) was used for the ordinary electric wire, that is, the electric wire 1 (refer to FIG. 4A). As for a litz wire A (the conductor cross-sectional area: 70 sq·mm) and a litz wire B (the conductor cross-sectional area: 11 sq·mm), that is, the electric wire 2 described above (refer to FIG. 4C), the electric wire used in around 20 kHz of frequency was used. Further, as for an ordinary power cable (the conductor cross-sectional area: 14 sq·mm), a commercially available cable was used.

As a result of providing the high frequency alternating current to each electric wire under equal conditions, as shown in FIGS. 3A and 3B (the vertical axis: resistance ratio; the horizontal axis: frequency), it was demonstrated that the electric wire 6 of the present invention, that is, the electric wires A and B had excellent frequency characteristics as compared to the conventional technology of this kind. In the case of the electric wires A and B of the present invention, data has shown that even though the frequency becomes high, the increase in a resistance ratio is suppressed to maintain an extremely low resistance ratio and the resistance ratio is on a declining trend. It was also confirmed that there was little difference in the data for the electric wires A and B and these wires were the same in performance. In other words, the same frequency characteristics could be obtained.

Also, data has shown that, in the case of the ordinary electric wire, the litz wires A and B, and the ordinary power cable, the resistance ratio shows a sharp increase as the frequency becomes high.

(6) In the electric wire 6 of the present invention provided with such an excellent frequency characteristic, the individual wire 7 has a hollow pipe structure and the high frequency alternating current flows on the whole surface making the individual wire 7 a circular conductor.

On the contrary, in the case of the electric wire 1 (ordinary electric wire) and the electric wire 2 (litz wire) of the conventional technology of this kind, the current-carrying surface is only the outer peripheral surface thereof. In this manner, the individual wires 3, 5 were formed, on the central portion in section, with a nonuse section, that is, a wasteful section (loss section) to which the electric current hardly flows (refer to FIGS. 1, 2 and 4).

In this manner, unlike the conventional technology of this kind, since the electric wire 6 is not provided with a nonuse section, that is, a wasteful section to which the electric current does not flow and the waste of the metal conductor which is the material for the individual wire 7 can be greatly eliminated, both the weight and cost can be significantly decreased.

(7) Further, the electric wire 6 can be readily made. Namely, the individual wires 7 as shown in FIGS. 1A and 1B are made according to a process for making ordinary metal pipe. Still further, the individual wires 7 as shown in an example of FIGS. 1C and 1D are made by causing the conductor metal to adhere to the outer periphery of the extra-fine insulating yarn by a metal plating method or a metal vapor-deposition method. Accordingly, the electric wire 6 can be readily made in the same way as the electric wire 1 (ordinary electric wire) described above.

(8) Incidentally, advantages of each example of the present invention will now be described. Since the hollow section of the individual wire 7 is an air cavity 9, there is an advantage in that the electric wire 6 of the example as shown in FIG. 1A is particularly excellent in decrease in weight as described in item (6) described above. In addition, since the electric wire 6 of the example as shown in FIG. 1C is provided in such a manner that the hollow section 8 of the individual wire 7 houses the insulating material 10 therein, there is an advantage in that the electric wire 6 is excellent in strength, elasticity and flexibility.

(9) The electric wires 6 of the example shown in FIGS. 2A and 2C have advantages described in item (8) with reference to the corresponding FIGS. 1A and 1C. Further, since the outer periphery of the individual wire 7 is coated with the insulating film 11, the electric wire 6 of the example is particularly excellent in the frequency characteristics of item (4).

As described above, in the electric wire 6 of the example as shown in FIGS. 2A and 2C, the outer periphery of the individual wire 7 is coated with the insulating film 11. It is therefore possible to broaden the outer peripheral area of the individual wire 7 as in the electric wire 2 (litz wire) of the conventional technology of this kind. In this manner, dispersion, mitigation and decrease of the concentration of the electric current density due to the skin effect can be further accelerated.

What is claimed is:

1. A high frequency electric wire, comprising a large number of individual wires bundled, twisted and insulated by an outer sheath and wherein the individual wires comprise individual wires comprising an extra-fine hollow pipe structure of a capillary shape.

2. The high frequency electric wire according to claim 1, wherein the extra-fine hollow pipe structure is an air cavity.

3. The high frequency electric wire according to claim 2, wherein outer periphery of the individual wires comprising an extra-fine hollow pipe structure is coated with an insulating film.

4. Apparatus comprising a non-contact power feeding device, the non-contact power feeding device supplying electric power to a secondary coil of a load side circuit from a primary coil of a power source side circuit, with non contact, based on a mutual induction action of electromagnetic induction, and the non-contact power feeding device comprising a circuit cable or a coil comprising the high frequency electric wire according to claim 2, the electric wire functioning to suppress or reduce increase of alternating current resistance due to a high frequency alternating current, thereby reducing Joule heat loss.

5. The high frequency electric wire according to claim 1, wherein the extra-fine hollow pipe structure houses an insulating material therein.

6. The high frequency electric wire according to claim 5, wherein the insulating material comprises an extra-fine insulating yarn and the extra-fine hollow pipe structure comprises a metal conductor plated or vapor deposited on the yarn.

7. The high frequency electric wire according to claim 5, wherein outer periphery of the individual wire is coated with an insulating film.

8. Apparatus comprising a non-contact power feeding device, the non-contact power feeding device supplying electric power to a secondary coil of a load side circuit from a primary coil of a power source side circuit based on a mutual induction action of the electromagnetic induction, and the non-contact power feeding device comprising a circuit cable or a coil comprising the high frequency electric wire according to claim 5, the electric wire functioning to suppress or reduce increase of alternating current resistance due to a high frequency alternating current, thereby reducing Joule heat loss.

\* \* \* \* \*